United States Patent Office 2,878,280
Patented Mar. 17, 1959

2,878,280

2-METHYL-2-SEC.-BUTYL-1,3-PROPANEDIOL DICARBAMATE

Frank M. Berger, Princeton, and Bernard J. Ludwig, North Brunswick, N. J., assignors to Carter Products, Inc., New York, N. Y., a corporation of Maryland No Drawing. Application November 29, 1955
Serial No. 549,873

1 Claim. (Cl. 260—482)

This invention relates to a novel organic compound and has for its object the provision of a new compound which has highly effective sleep-inducing characteristics. The invention is based on the discovery that in the class of 2,2-disubstituted dicarbamates one compound possesses marked sleep-inducing properties. This compound is 2-methyl-2-sec-butyl-1,3-propanediol dicarbamate.

The aforementioned compound of this invention is a white crystalline solid soluble in most organic solvents, but soluble to only a slight degree in water. It forms stable solutions in water and organic solvents. Upon heating or boiling with acid or alkali, this compound hydrolyzes to give the corresponding 2-,2-disubstituted 1,3, propanediol, ammonia and carbon dioxide.

The novel compound may be prepared by reacting 2-methyl-2-sec-butyl-1,3,-propanediol with phosgene to form the corresponding di-chlorocarbonate derivative. This reaction is promoted by the addition to the reacting compounds of acid combining agents such as sodium hydroxide, antipyrine, dialkylaniline and the like. The di-chlorocarbonate derivative is then converted to the di-carbamate by ammoniation, using either anhydrous or aqueous ammonia.

The compound may also be prepared from the diol by ester exchange using a low molecular weight urethane. In this reaction the low molecular weight alcohol contained in 2 equivalents of urethane is replaced by 2-methyl-2-sec-butyl-1,3-propanediol to give the desired dicarbamate.

The 2-methyl-2-sec-butyl 1,3-propanediol used in making the novel compound may be prepared by any known method as, for example, by the reduction of the corresponding disubstituted malonic ester.

To describe the invention more particularly, the following examples serve to illustrate the method of preparation of the novel compound of this invention. Example I serves to illustrate the preparation of the diol from which the novel dicarbamate is formed. Example II describes a method of preparing the novel dicarbamate from its corresponding diol.

Example I

The following example illustrates the preparation of 2-methyl-2-sec-butyl-1,3-propanediol:

92 gms. of diethyl-sec-butyl methyl malonate were reduced in the usual manner using 22.8 gms. of lithium aluminum hydride in a suitable volume of anhydrous ethyl ether. The mixture was treated with 10% sulfuric acid and the ether soluble components extracted. The ether solution was dried, using a suitable drying agent, and the residue obtained by the removal of the ether was purified by distilling under reduced pressure. This material was further purified by redistillation. Approximately 46 gms. of 2-methyl-2-sec-butyl-1,3-propanediol were obtained as a clear colorless liquid, boiling point 92–97° C. (0.1 mm. pressure). Refractive index, $N^{26}D=1.4587$. Solubility in water approximately 0.5%. Analysis.—Calculated for $C_8H_{18}O_2$: C, 65.7%; H, 12.4%. Found: C, 66.1%; H, 12.1%.

Example II

The following example describes the preparation of 2-methyl-2-sec-butyl-1,3-propanediol dicarbamate using the urethane exchange method:

14.6 gms. of 2-methyl-2-sec-butyl-1,3-propanediol and 18.7 gms. ethyl urethane are dissolved in about 100 ml. anhydrous toluene. 3 gms. of aluminum isopropylate are added and the mixture distilled to remove the ethyl alcohol formed in the condensation of ethyl urethane and the diol. The alcohol distills in the form of an azeotrope with toluene. Distillation is continued until the theoretical quantity of ethanol has been removed. The toluene is distilled from the mixture under reduced pressure and the residue dissolved in hot aqueous isopropanol solution. The hot solution is filtered and allowed to cool, whereupon approximately 14 gms. of product separates. The purified product represents a yield of about 60% of theoretical and melts at 77–79°. Solubility in water approximately 0.1%. Analysis.—Calculated for $C_{10}H_{22}O_4H_2$: N, 12.06. Found: N, 12.02%.

When the compound of this invention is tested in suitable experimental animals, such as mice, for its ability to induce sleep, it is found that it has intensive sleep-inducing action. It is also found that the dosages which are required to induce sleep are smaller than those exerting a marked paralyzing action on voluntary muscles. It is also found that this compound is not effective as anti-convulsant agents in preventing the occurrence of electroshock seizure because the dosage required for such purpose is greater than that required in exerting a complete paralyzing action on the voluntary muscles.

Advantageously, the compound of this invention, when used as sleep-inducing drugs, does not cause inconvenient or dangerous side effects so often induced by the commonly used sleep-inducing drugs, such as the barbiturates. Moreover, it is entirely safe to use, possessing a "standard safety margin" between the lethal dose and the hypnotic or sleep-inducing dose.

The results of studies on experimental animals show conclusively that the compound of this invention possesses unique qualities with respect to its sleep-inducing action. As indicated heretofore, this novel compound exhibits marked sleep-inducing properties when tested in mice. On the other hand, the related isomer 2-methyl-2-n-butyl-1,3-propanediol dicarbamate when given to mice in equivalent dosages exhibits no marked sleep-inducing action.

The compound of this invention is primarily intended for oral use and formed into suitable pills, tablets or capsules by well-known practices. It may be dissolved in a suitable solvent such as a mixture of water and polyethylene glycol to give a solution suitable for injection or use as an enema.

We claim:
2-methyl-2-sec-butyl-1,3-propanediol dicarbamate.

References Cited in the file of this patent

UNITED STATES PATENTS 2,724,720     Berger et al. _____ Nov. 22, 1955

OTHER REFERENCES

Berger: J. Pharm. Expt. Ther. 104 (1952), 229–33.
"Miltown" (published by Wallace Laboratories, New Brunswick, N. J., 1956), pp. 1–24.